INVENTOR.
Richard H. Champion
BY
Herbert Furman
ATTORNEY

INVENTOR.
Richard H. Champion
BY
Herbert Furman
ATTORNEY

United States Patent Office 3,338,624
Patented Aug. 29, 1967

3,338,624
FOLDING CLOSURE FOR CONVERTIBLE TOP STORAGE COMPARTMENT
Richard H. Champion, Rochester, Mich., assignor to General Motors Corporation, Detroit, Mich., a corporation of Delaware
Filed Feb. 15, 1966, Ser. No. 527,451
7 Claims. (Cl. 296—136)

This invention relates generally to a vehicle body closure and more particularly to a folding closure for a vehicle convertible top storage compartment.

The closure of this invention includes a first panel secured to the body for movement between open and closed positions and a second panel secured to the first panel for movement therewith and for movement between extended and retracted positions relative thereto. When the top is raised, the second panel is retracted and the first panel and the top close the storage compartment. When the top is stored, the second panel is extended relative to the first panel and both panels close the compartment.

One feature of this invention is that the second panel is connected to the body by an articulated linkage which controls the second panel position. Another feature is that means actuated by the top controls the articulated linkage. Yet another feature is that the articulated linkage normally retains the second panel in retracted position during movement of the first panel. A further feature is that the top actuated means includes a lever engageable with stop means on the articulated linkage to extend the second panel during movement of the first panel from open to closed position. A still further feature is that the lever is controlled by a linkage actuated by the top in stored position.

A better understanding of this invention may be had by reference to the following specification and the attached drawings in which.

Figure 1:
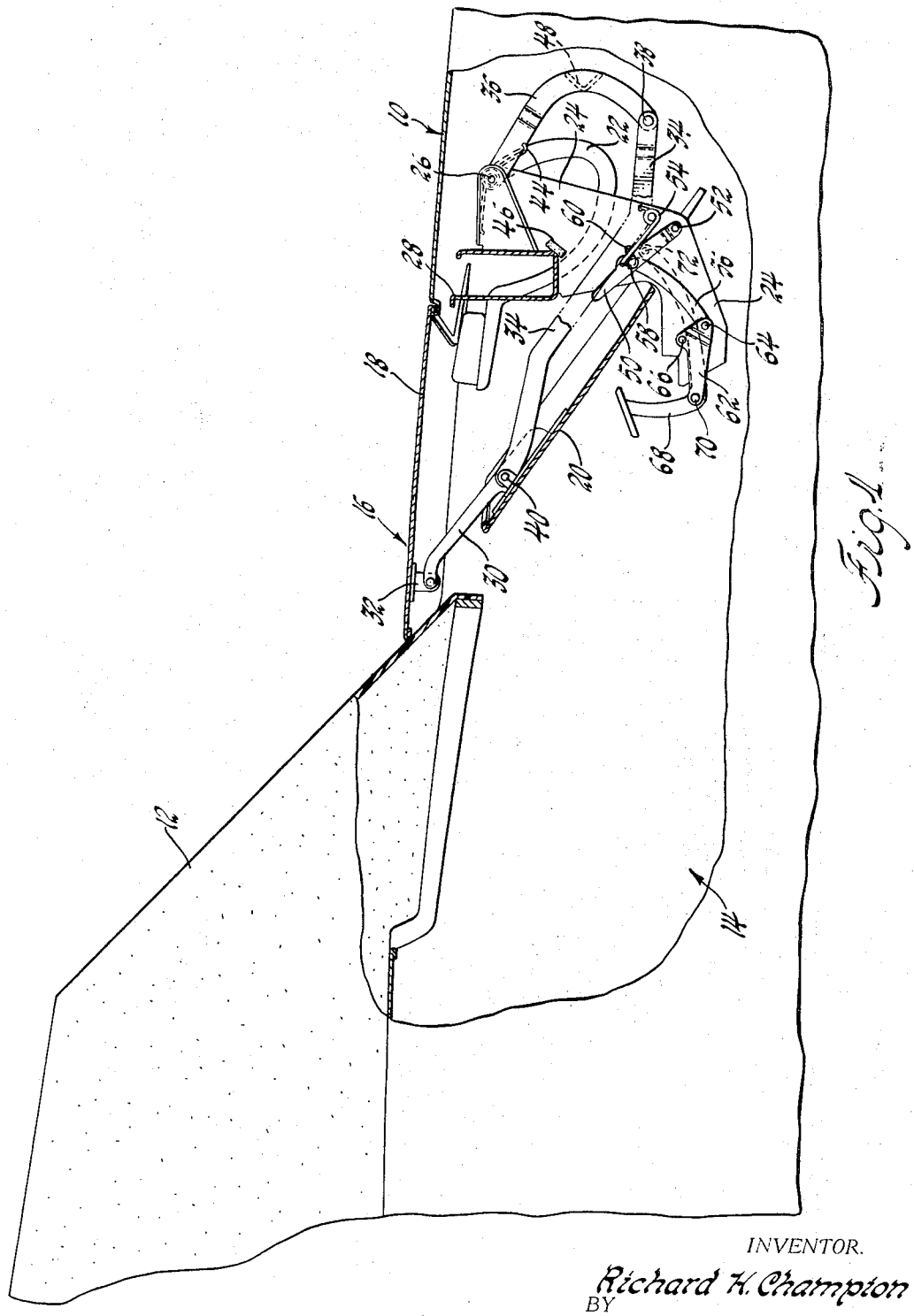
FIGURE 1 is a partially broken away partial side view of a vehicle having a convertible top and a storage compartment therefor and embodying a closure according to this invention, with the closure being shown in closed position and the top in raised position.
Figure 2:
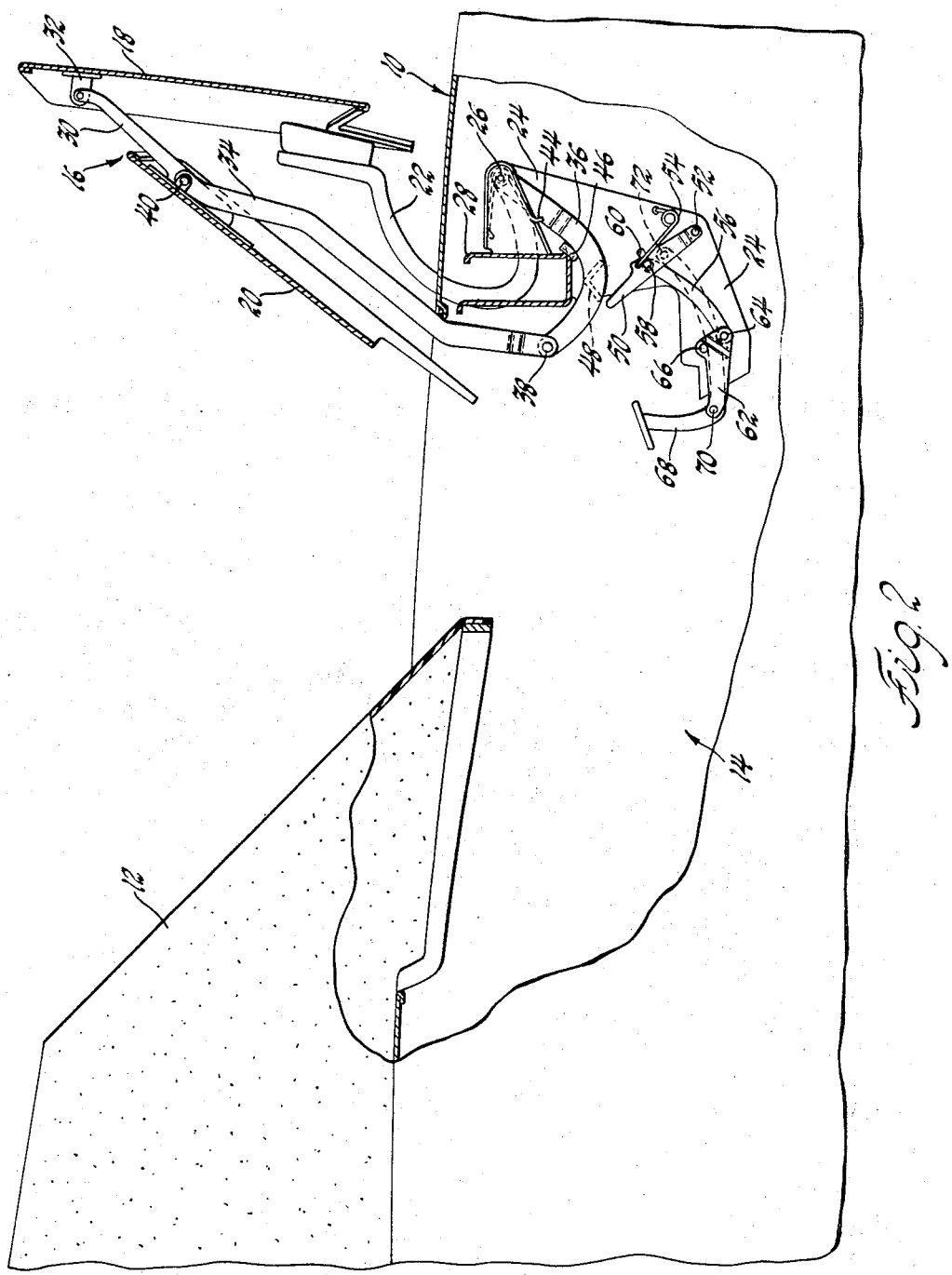
FIGURE 2 is a view similar to FIGURE 1 showing the closure in open position.
Figure 3:
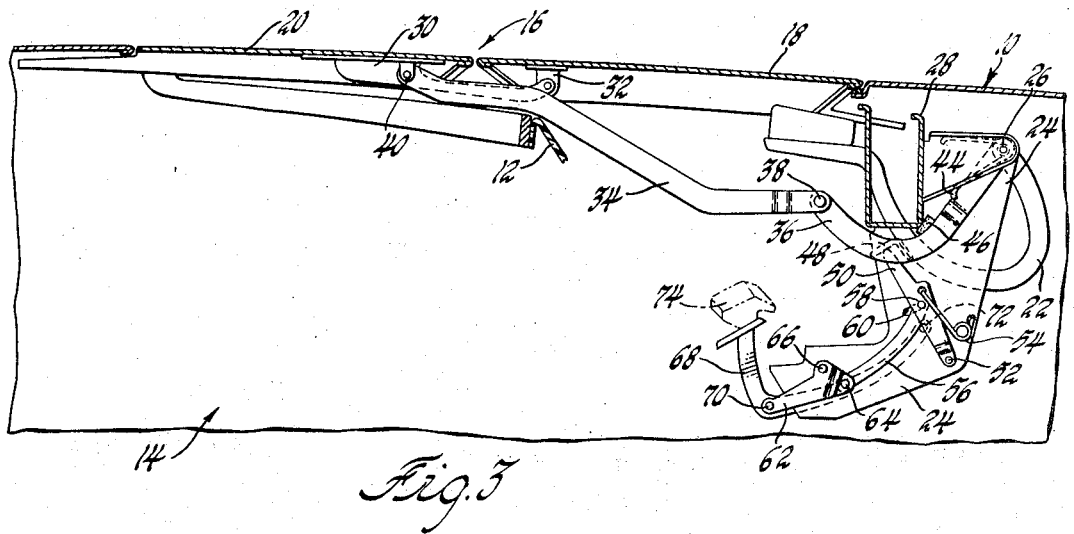
FIGURE 3 is a view similar to FIGURE 1 showing the closure in closed position and the top in stored position.

Referring now to FIGURES 1 to 3, vehicle body 10 mounts a conventional convertible top 12 for movement by a conventional actuating mechanism, not shown, between a raised position, shown in FIGURES 1 and 2, and a stored position, shown in FIGURE 3, within a storage compartment 14. A closure 16 comprising a first panel 18 and a second panel 20 is provided for compartment 14. As shown in FIGURE 1, panel 18 and top 12 close compartment 14 when the top is in raised position, while panel 20 is retracted beneath panel 18 within compartment 14. As shown in FIGURE 3, both panels 18 and 20 close compartment 14 when the top is in stored position. To permit movement of top 12 between raised and stored positions, closure 16 is movable to an open position, shown in FIGURE 2, in which panel 18 is swung vertically and panel 20 is retained in its retracted position. Thus, closure 16 is movable between two closed positions and one open position relative to compartment 14.

Referring now to FIGURE 1, a hinge arm 22 pivotally connects panel 18 to a support bracket 24 at 26. Bracket 24 is secured to a transverse body member 28. A hinge arm 30 pivotally connects panel 20 to a bracket 32 on panel 18. An articulated linkage, comprising links 34 and 36 pivoted together at 38, interconnects panel 20 and the body. Link 34 is pivoted at 40 to panel 20, while link 36 is pivoted at 26 to bracket 24. A spring 44 normally biases link 36 counterclockwise to maintain panel 20 retracted beneath panel 18.

Assume now that closure 16 is in its closed position of FIGURE 1 and it is desired to lower top 12. A suitable power means, not shown, secured to hinge arm 22 is actuated to move panels 18 and 20 from their position of FIGURE 1 to their position of FIGURE 2. The opening movement of closure 16 is limited by a stop 46 on body member 28 which limits the clockwise movement of link 36. Top 12 is then lowered into compartment 14.

Figure 4:
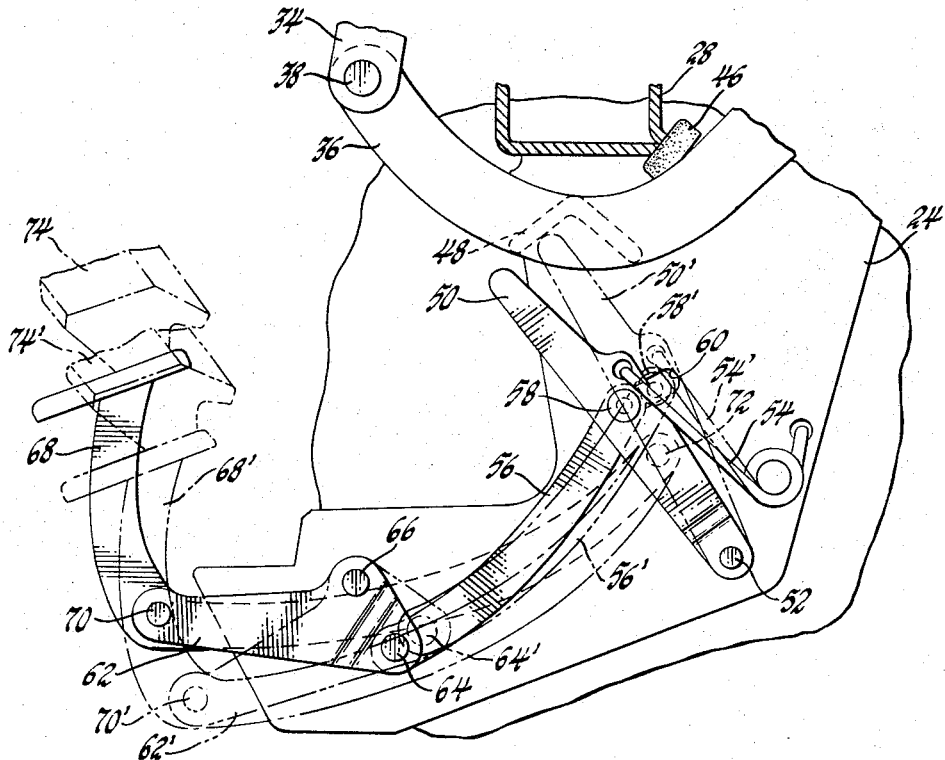
FIGURE 4 is an enlarged view of a portion of FIGURE 3.

Referring now to FIGURE 4, link 36 includes an angled stop 48 which is selectively engageable by a lever 50 pivoted at 52 to bracket 24. Lever 50 is normally biased counterclockwise by a bracket-mounted torsion spring 54. A link 56 is secured to lever 50 by a pin 58 received within a bracket slot 60. A bell crank 62 is pivoted at 64 to link 56 and at 66 to bracket 24. An actuating lever 68 is pivoted to bell crank 62 at 70 and to bracket 24 at 72. When top 12 is fully lowered into compartment 14, the top header 74 engages lever 68, rotating it counterclockwise about pivot 72. This movement of lever 68 causes the levers and links to move to the illustrated dashed line positions in which the elements are indicated by like prime numerals. Lever 50 is thus moved into engagement with stop 48 against the force of spring 54. In this position lever 50' and stop 46 immobilize link 36 and fix pivot 38.

After the top is fully lowered the power means is actuated to move closure 16 from the open position of FIGURE 2 to the closed position of FIGURE 3. As closure 16 is lowered, panel 20 is extended from beneath panel 18 by link 34, which rotates about fixed pivot 38, until the position of FIGURE 3 is reached.

When it is desired to raise top 12, the power means is actuated to move closure 16 from the closed position of FIGURE 3 to the open position of FIGURE 2. Link 34 retracts panel 20 beneath panel 18. As the top is raised, header 74 moves out of engagement with lever 68 and spring 54 moves the levers and links to their solid line positions shown in FIGURE 4.

After the top is raised, closure 16 is moved from the open position of FIGURE 2 to the closed position of FIGURE 1. Since lever 50 is disengaged from stop 48, spring 44 biases link 36 counterclockwise to retain panel 20 beneath panel 18 during the descent of closure 16.

The closure may also be operated manually, whereupon its operation will be identical to that described above. When a power means is used to operate the closure, conventional limit switches and other electrical means may be utilized to correlate the movement of the closure with that of the top. It is also contemplated that means other than the vehicle top may be utilized to selectively control the relative positions of the panels in closed position. While only a preferred embodiment is shown and described, modifications thereof are contemplated within the scope of this invention.

I claim:
1. In combination with a vehicle body having a convertible top movable between raised and stored positions and a storage compartment for the top, closure means for the compartment comprising, a first panel secured to the body for movement between an open position permitting said movement of the top and a closed position, means for moving the first panel, the first panel in the closed position cooperating with the top in the raised position to close the compartment, a second panel secured to the first panel for movement therewith and for movement between extended and retracted positions relative thereto, the second panel in extended position cooperating with the first panel in closed position to close the compartment in top stored position, operating means interconnecting the second panel and the body and operable to move the second panel relative to the first panel upon movement of the first panel, and control means selectively controlling operation of the operating means.

2. The combination recited in claim 1, wherein the operating means includes an articulated linkage interconnecting the second panel and the body and the control means includes means for selectively immobilizing one link thereof to cause another link thereof to extend the second panel relative to the first panel upon movement of the first panel from open to closed positions.

3. The combination recited in claim 2, wherein the control means is responsive to the position of the top.

4. The combination recited in claim 2, wherein the immobilizing means includes first means mounted on the said one link and second means mounted on the body and selectively engageable with the first means.

5. The combination recited in claim 4, wherein the second means is movably mounted on the body and is normally positioned out of engagement with the first means, the control means being responsive to movement of the top to stored position to move the second means into engagement with the first means and immobilize the said one link.

6. The combination recited in claim 1, wherein the operating means includes an articulated linkage interconnecting the second panel and the body and positioning means connected to the linkage and normally causing the linkage to retain said second panel in retracted position during movement of the first panel between open and closed positions, and the control means includes means selectively operable to override the positioning means and immobilize one link of the linkage to cause another link thereof to extend the second panel relative to the first panel upon movement of the first panel from open to closed positions.

7. The combination recited in claim 6, wherein the selectively operable means includes a first stop member mounted on the said one link, a second stop member mounted on the body for movement into and out of engagement with the first stop member, means biasing the second stop member out of engagement with the first stop member, and a control linkage connected to the second stop member and including means engageable by the top during movement to stored position to cause the control linkage to move the second stop member against the action of the biasing means and into engagement with the first stop member to immobilize the said one link and override the positioning means, the said another link thereby extending the second panel relative to the first panel upon movement of the first panel from open to closed positions.

References Cited

UNITED STATES PATENTS

| | | | |
|---|---|---|---|
| 2,845,299 | 7/1958 | Pickering | 296—136 |
| 2,992,042 | 7/1961 | Gilson et al. | 296—136 |
| 3,170,726 | 2/1965 | Lystad | 296—136 |
| 3,180,676 | 4/1965 | Payne | 296—136 |

LEO FRIAGLIA, *Primary Examiner.*

C. C. PARSONS, *Assistant Examiner.*